United States Patent [19]
Greene et al.

[11] Patent Number: 6,039,510
[45] Date of Patent: Mar. 21, 2000

[54] CARRIER AUTOMATIC BRAKING SYSTEM

[75] Inventors: Harold R. Greene, Lake Kiowa; David W. Carder, Highland Village; Jack E. Balko, Dallas, all of Tex.

[73] Assignee: Comco Systems, Dallas, Tex.

[21] Appl. No.: 09/102,244

[22] Filed: Jun. 22, 1998

[51] Int. Cl.[7] .................................................. B65G 51/20
[52] U.S. Cl. .............................. 406/21; 406/84; 406/112
[58] Field of Search ................................. 406/13, 15, 16, 406/17, 18, 19, 20, 21, 22, 84, 110, 111, 112, 147, 176

[56] References Cited

U.S. PATENT DOCUMENTS

| | | | |
|---|---|---|---|
| 3,985,316 | 10/1976 | Weissmuller | 406/110 |
| 4,032,082 | 6/1977 | Weissmuller | 406/112 |
| 4,180,354 | 12/1979 | Greene | 406/112 |
| 4,984,939 | 1/1991 | Foreman et al. | 406/112 X |
| 5,584,613 | 12/1996 | Greene et al. | 406/19 |

*Primary Examiner*—Andrew C. Pike
*Attorney, Agent, or Firm*—Sidley & Austin

[57] ABSTRACT

A pneumatic transmission system having a carrier automatic braking system contains a transport conduit having a first end and a second end and being capable of permitting the transfer of a carrier therethrough, a first station for sending and receiving a carrier located on one end of the transmission conduit, and a second station for sending and receiving a carrier located on the other end of the transmission conduit. A motor blower, capable of moving a volume of air through a conduit, is enclosed within a supply/exhaust branch which is connected to one of the stations. A valve, capable of closing, to thereby create an air block in the supply line, is also disposed within the supply/exhaust branch. The motor blower blows air to move the carrier from one station to the other. The valve is activated, after deactivating the motor blower, when the carrier is detected at some predetermined location along the transport conduit. The valve closing creates an air block within the supply/exhaust branch which prohibits air from entering or exiting the conduit on the air block side of the carrier as the carrier moves along the transport conduit. The change in differential pressure across the carrier slows the carrier as it approaches its destination station.

21 Claims, 3 Drawing Sheets

CARRIER AUTOMATIC BRAKING SYSTEM

FIELD OF THE INVENTION

This invention is directed generally to a pneumatic transmission system for transmitting a carrier between two points. Specifically, this invention relates to a system for braking a carrier in a pneumatic transmission system, as the carrier approaches its destination point. In one aspect, this invention relates to a transmission system having at least one open terminal or station, one blower to transmit the carrier toward its destination point, and a valve which is closed for a predetermined period of time after the blower has been deactivated, to thereby slow the carrier as the carrier approaches its destination point.

BACKGROUND OF THE INVENTION

Pneumatic transmission systems are widely known and are used to transmit articles from a first place to a second place which is remote from the first place. Pneumatic transmission systems usually include at least two stations, a tube or conduit extending between the two stations, and a carrier positioned within the tube so as to be delivered by pneumatic pressure. The pressure can be a superatmospheric pressure or a subatmospheric pressure.

A common use for a pneumatic transmission system is in drive-in bank teller facilities where business is conducted via a carrier transmitted between the bank and the remote drive-in terminal. Other uses include sending documents between different floors in a building, or from one office to another office located some distance apart.

An example of a conventional pneumatic transmission system that used a pair of blowers is shown in FIG. 1. A first station 30 and a second station 35 are connected by a transmission tube 40. A first blower 10 is located at the first station 30 and can pressurize the air behind a carrier 45, thereby creating enough differential pressure (ΔP) across the carrier 45 to push the carrier 45 upwardly from station 30, then along the horizontal section of the tube 40 to the second station 35. Similarly, the second blower 20, which is located at the second station 35, can pressurize the air behind the carrier 45 and send the carrier 45 in the opposite direction toward the first station 30. In one such system, the blowers were a pair of vacuum cleaner motors which were physically and electrically isolated from each other so that each blower 10 and 20 was operated independently of the other blower. The first blower 10 can be turned on by actuating a first mechanical switch 15, sending a carrier 45 from the first station 30 to the second station 35. The second blower 20 can be turned on by actuating a second mechanical switch 25 to send a carrier 45 from the second station 35 to the first station 30. If a first carrier 45 was inserted in the first station 30 and the blower 10 was turned on and then a second carrier 45 was inserted in the second station 35 and the blower 20 was turned on while the first carrier 45 was in transit, thereby placing two carriers in the transmission tube 40 simultaneously, the movements of the two carriers 45 would be blocked until one of the blowers 10 or 20 was turned off, at which time both carriers would proceed in the direction dictated by the blower which remained on.

In many pneumatic transmission systems, the carrier would travel through the tube and impact a stop device once it had reached its intended destination. In such systems the carrier can travel at speeds of 15–20 feet/second or higher, and the impact of the carrier against the stop device can cause great wear on both the carrier and the system as well as damage the contents of the carrier.

One method for obviating the high velocity impact between the carrier and the stop device has employed the use of an air cushion adjacent to the receiving terminal, as illustrated in FIG. 2. The air cushion is created by pneumatically sealing the receiving terminal 50 (making it a closed terminal) and providing a vent 65 (or check valve) in the tube 75 a short distance from the receiving terminal 50 such that when the carrier 70 passes the vent 65 in an approach to the receiving terminal 50, a trapped column of air is created in the approach leg 55 of the tube 75 which serves to decelerate or "cushion" the carrier 70 as the carrier 70 makes its final approach to the receiving terminal 50. The check valve 65 is opened to the atmosphere either directly, or through a conduit 60 as shown. However, such an air cushion system requires that the receiving terminal have a door capable of pneumatically sealing the terminal. The system operator must then manually open the terminal door in order to retrieve the carrier from the system. Alternatively, a complicated mechanism can be provided to automatically open the terminal door upon the arrival of the carrier. However, such mechanisms are often costly and prone to mechanical failures at inopportune times.

This form of operation is well known in the art of pneumatic systems. However, slowing down a carrier is not this simple when the destination station is an open air station. There is no dead column of air when the station is open to the atmosphere because the air in front of the carrier is exhausted out of the open station. Therefore, there is no pressure build up in front of the carrier and there is no slowing force to act upon the carrier.

Other attempts to resolve the high impact problem have included the use of other trigger means to shut off the stream of air. These alternative trigger means include such items as a photocell, a timing device, a limit switch, a spring catch, and combinations thereof.

An alternative system in which a carrier is decelerated prior to entering an open terminal is disclosed in U.S. Pat. No. 4,180,354 to Greene. U.S. Pat. No. 4,180,354 discloses a transmission system in which the pressurized air behind the carrier is routed principally through a check valve positioned near the open terminal to allow the carrier sufficient time to decelerate before discharging into an open terminal. An adjustable valve allows some air to continue to push the carrier to the terminal. A secondary air line adjacent to the open terminal draws in the air from the main transmission line and reroutes it to the blower, thus avoiding the blowing of air through the open terminal. The carrier is decelerated by simply choking off most of the air behind it at a point near the open terminal so that the carrier ejects with a minimum speed from the transmission line into the open terminal. The above cited system is a way to slow a carrier as it approaches an open destination terminal. However, this system requires multiple routing conduits and an adjustable valve to achieve the desired result.

Still another alternative system in which a carrier is decelerated prior to entering an open terminal is disclosed in U.S. Pat. No. 4,984,939 to Foreman et al. This patent discloses the use of one pressure blower and one vacuum blower, wherein the vacuum blower is operated at an equal or greater capacity than the pressure blower. The pressure blower and vacuum blower are attached to the transmission conduit by air tubes at different locations along the transmission conduit. In this system, a carrier is sent from a first station to a second station by activating the pressure blower at a certain capacity to create a ΔP across the carrier thereby moving it out of the first station, through the transmission conduit and toward the second station. The vacuum blower is attached to the transmission conduit at some point near the second station. As the carrier approaches the second station, the carrier is slowed by the counterflow of air due to the vacuum blower. The vacuum blower sucks air out of the transmission conduit behind the carrier at an equal or greater capacity than the pressure blower, which reverses the ΔP across the carrier and slows the carrier as the carrier makes its final approach to the open terminal.

As mentioned above, this system requires multiple transmission conduits and precise timing in order to operate effectively.

Yet another alternative system in which a carrier is decelerated prior to entering an open terminal is disclosed in U.S. Pat. No. 5,584,613 to Greene et al. This patent discloses the use of a first blower to transmit a carrier toward its destination point while a second opposing blower is activated for a predetermined period of time while the first blower remains on, to create an air block. The thus established air block slows the carrier as it approaches its destination point. The opposing blowers are positioned in a supply/exhaust branch circuit which is attached to a first station. In this system, a carrier is sent from the first station to a second station by activating the first blower at an established capacity to create a ΔP across the carrier, thereby moving it out of the first station, through the transmission conduit and toward the second station. As the carrier approaches the second station, the second opposing blower is activated, thus the carrier is slowed by the air block created by the operation of the opposing blowers. The air block creates a situation where the ΔP across the carrier in the transport conduit decreases, and is preferably reversed, to thereby slow the carrier as the carrier makes its final approach to the second station. The stress placed on the blowers due to their opposing efforts can, however, impact the life expectancy of the blowers.

Conventional pneumatic transmission systems are also used in multistation configurations, such as in a hospital. In these systems, one central station, a laboratory for example, sends a carrier to any one of many receiving stations such as nurse stations. The cargo inside the carrier in these systems can be fragile. Therefore, it is advantageous to allow the carrier to enter the open stations at a low rate of speed in order to maintain the integrity of the cargo. Conventional multistation pneumatic transmission systems currently have to use a slide gate at each station in order to achieve this result. The slide gate is a combination of a door and a motor, which is activated as the carrier enters the particular station. Upon approach of the carrier, the motor is activated and the slide gate positions itself inside the transmission conduit. The slide gate effectively closes the transmission conduit in front of the carrier, thereby forming a dead column of air in front of the carrier. The carrier is slowed as it falls on the dead column of air, and finally comes to rest on the slide gate. The slide gate is then removed from the transmission conduit, allowing the carrier to drop into the open station.

The problems associated with the above described conventional multistation pneumatic transmission systems include, among other things, the cost of numerous slide gates and the lack of reliability due to the use of additional moving parts.

BRIEF SUMMARY OF THE INVENTION

The present invention is a new and advantageous system and method for braking a carrier in a pneumatic transmission system as the carrier approaches its destination terminal. The pneumatic transmission system of the present invention includes at least a first station and a second station, a transport conduit connected to each of the first and second stations, a supply/exhaust branch conduit connected to the first station, a motor driven blower and a valve positioned in the supply/exhaust branch conduit, a controller, and a sensor associated with the transport conduit at a location a predetermined distance away from the second station.

The present invention can be implemented in a multistation pneumatic transmission system. The use of the present invention would eliminate the need for slide gates at all of the receiving stations as described above with respect to a conventional multistation pneumatic transmission system.

The blower is activated to move a carrier from the first station to the second station via the transport conduit. The sensor detects the presence of the carrier in the transport conduit as the carrier passes the sensor location and the sensor then signals the controller. The controller receives the signal from the sensor and, in turn, deactivates the blower and closes the valve for a predetermined amount of time, to thereby create an air block in the transport tube behind the carrier. The air block creates a situation where the (ΔP) across the carrier in the transport conduit decreases, and is preferably reversed, to thereby slow the carrier as the carrier makes its final approach to the second station.

A method for braking a carrier, in a pneumatic transmission system, as the carrier approaches a receiving station includes the steps of activating a first blower for moving air in a first direction to thereby transmit the carrier from a transmitting station toward the receiving station via a transport conduit, sensing the presence of the carrier at a location along the transport conduit, and, upon sensing the presence of the carrier at the location, deactivating the blower and closing a valve for a predetermined time, for creating an air block in the transport tube behind the carrier, thereby decreasing, and preferably reversing, the ΔP across the carrier.

DETAILED DESCRIPTION OF THE INVENTION

Figure 1:
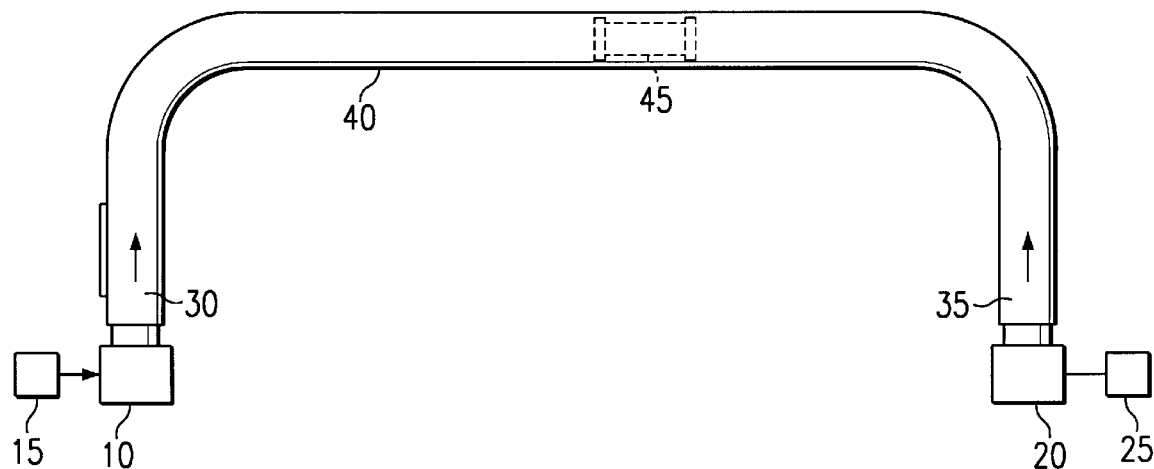
FIG. 1 is a block diagram illustrating a conventional pneumatic transmission system utilizing a pair of vacuum cleaner motor blowers.
Figure 2:
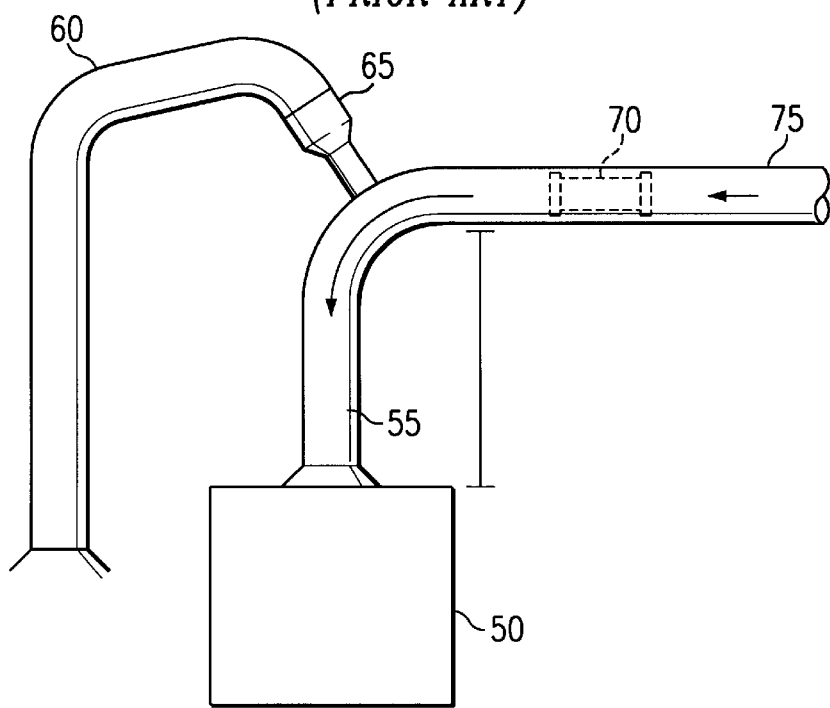
FIG. 2 is an illustration of a conventional braking system used when the destination station is closed to the atmosphere.
Figure 3:
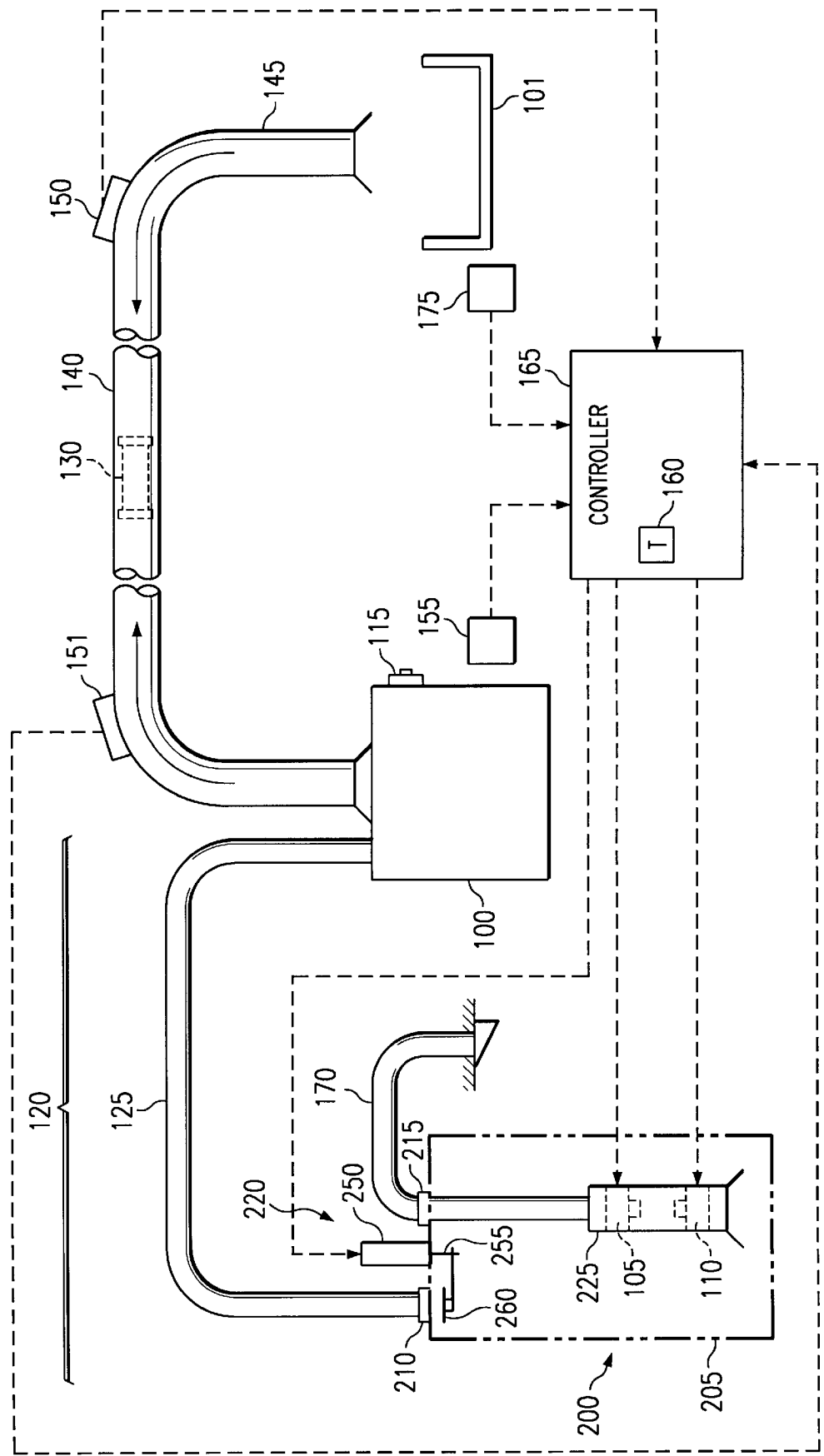
FIG. 3 is a schematic illustration of a pneumatic transmission system containing an embodiment of a carrier automatic braking system in accordance with the present invention.

FIG. 3 illustrates a pneumatic transmission system containing an embodiment of a carrier automatic braking system in accordance with the present invention. The present system comprises a station 100 and a station 101 connected by a substantially airtight transport tube 140, which is open to the atmosphere at station 101, with a blower assembly 200 being positioned within a supply/exhaust branch 120 which is connected to station 100. The supply/exhaust branch 120 includes a conduit 125 which is substantially airtight and a vent/inlet 170 which is open to the atmosphere and can provide air from the atmosphere to the pneumatic transmission system or can allow the exhaust of air from the pneumatic transmission system to the atmosphere. Conduit 125 does not have to be of a similar internal diameter as tube 140 because no carrier is transported therethrough, only air. The blower assembly 200 is comprised of a substantially airtight blower housing 205, show in phantom, which has a first port 210 and a second port 215 in one end. A solenoid valve 220 is mounted to the end of blower housing 205 such that, when actuated, the solenoid shaft 255 at least partially retracts into solenoid housing 250, thereby blocking port 210 with valve disk 260, and preventing air flow through port 210. The present invention, however, is not limited to a solenoid valve. A pair of vacuum cleaner motor blowers 105 and 110 are positioned in a blower tube 225 in series with each other, meaning the vacuum cleaner motor blowers 105 and 110 are within the same air flow path. Furthermore, the vacuum cleaner motor blowers 105 and 110 are spatially separated from each other within the blower tube 225. Blower tube 225, and thus the vacuum cleaner motor blowers 105 and 110, are disposed within blower housing 205. Blower tube 225 is substantially open on one end and is substantially closed on the other end except for communication with port 215. The supply/exhaust branch 120 is connected to station 100 at one end and open to the atmosphere at vent/inlet 170 for supplying or exhausting air. Station 100 can be a closed station, meaning that it can be sealed by closing a door 115 so that, except for the supply/exhaust branch 120, it is substantially closed to the atmosphere during transport of a carrier 130. Station 101 can be either a closed station with a vent or a station which is open to the atmosphere during transport of the carrier 130, but it is shown as an open station for the purpose of this embodiment. The carrier 130 is capable of being filled with items to be transferred and is inserted at either station for transfer to the other station.

The transport tube 140, which is connected to station 100 at one end and to station 101 at its other end, is of sufficient internal diameter such that the carrier 130 can be transmitted therethrough. Transport tube 140 can have any spatial orientation and can include curved portions, straight portions, vertical portions, and horizontal portions, dependent upon the circumstances under which the system is going to be used. For example, the approach leg 145 is shown as a curve from a horizontal direction to a vertical downward direction. However, this approach leg 145 can also remain horizontal or curve in a vertical upward direction as it connects with station 101. The transport tube 140 and the carrier 130 can have nearly any desired dimension and cross section, dependent on the system needs. The transport tube 140 can include any transmission line of any crosssectional form having a pneumatic channel formed therethrough.

To send the carrier 130 from station 100 to station 101, the first motor blower 105 is activated during the transfer phase of the cycle to intake air through the vent/inlet 170 and to apply pressurized air to the carrier 130, which creates a $\Delta P$ across the carrier 130 and moves the carrier 130 upwardly, out of station 100, and then horizontally through the tube 140 toward station 101. The motor blower 105 can generate approximately 5 psig behind the carrier 130. Likewise, to send the carrier 130 from station 101 to station 100, the second motor blower 110 would be activated instead of the first motor blower 105, to exhaust air through the vent/inlet 170, thereby creating at least a partial vacuum in the tube 140 on the station 100 side of the carrier 130, while the station 101 side of the carrier 130 remains at 0 psig because it is open to the atmosphere. This $\Delta P$ across the carrier 130 generates a force moving the carrier 130 in the opposite or station 100 direction.

In order to send the carrier 130 from station 100 to station 101, the carrier 130 is placed in the tube 140 and the door 115 is shut and sealed. The first motor blower 105 is then activated. This can be done by an operator actuating a switch 155, which is coupled to a controller 165. The controller 165 is coupled to the first motor blower 105 and to the second motor blower 110 for selective activation of the blowers 105 and 110. When switch 155 is actuated, the switch 155 sends a control signal to the controller 165. The controller 165 receives the control signal from the switch 155 and provides a control signal to the first motor blower 105, to thereby activate the first motor blower 105. The controller 165 is also coupled to a sensor 150 which is positioned near or on the transmission tube 140. The sensor 150 does not need to be in physical contact with the transmission tube 140, but it must be positioned such that it is able to sense the carrier 130 as the carrier passes a predetermined location in the transmission tube 140 related to the approach of the carrier 130 to the station 101. The present invention is not limited to an electrical coupling, or even a physical connection between the controller 165 and its peripherals.

First motor blower 105 blows air through supply/exhaust branch 120 and conduit 125 to the first station 100 and creates a $\Delta P$ across the carrier 130, thus moving it towards station 101. The motor blowers used in this embodiment can be standard vacuum cleaner motor blowers such as Model No. 115923 manufactured by Ametek Lamp. Vacuum cleaner motor blowers 105 and 110 are substantially equal in size and in output capacity, although mounted in opposite directions. These vacuum cleaner motor blowers 105 and 110 are capable of operating at approximately 23000 RPM and of generating approximately 124 CFM.

As the carrier 130 moves through the tube 140, it reaches the portion of the tube 140 where it is detected by the sensor 150. The sensor 150 detects the presence of the carrier 130 as it passes a predetermined location in the transmission tube 140 and provides a control signal to the controller 165 indicative of that detection. The controller 165 receives this control signal from the sensor 150 and provides a control signal to first motor blower 105 to thereby deactivate the first motor blower 105, to solenoid valve 220 to thereby actuate solenoid valve 220 thus blocking port 210, and to start the timer 160. The timer 160 can be an external peripheral device or it can be integrated in the controller 165. In this embodiment, timer 160 is preferably a Model No. RTE B21 manufactured by IDEC. An air block is created in conduit 125, and thus in pneumatic tube 140, by the blocking of port 210 by solenoid valve 220.

Once the air block is on, a finite amount of air remains in the tube 140 between the carrier 130 and the station 100 because no additional air can get by solenoid valve 220 and through port 210 in either direction. As the carrier 130 continues to move through the tube 140 toward the station 101, the volume of the portion of the tube 140 between the air block and the carrier 130 increases, and as that volume increases, the air pressure in the tube 140 behind the carrier 130 decreases because the amount of air between the air block and the carrier 130 remains substantially constant. The pressure on the station 101 side of the carrier 130, however, is substantially constant at 0 psig because the station 101 is open to the atmosphere. Therefore, as the pressure between the air block and the carrier 130 decreases as the carrier 130 moves through the final approach section 145 of the tube 140, the carrier 130 slows down due to the decreasing $\Delta P$ across the carrier 130. In this embodiment, the carrier 130 reaches a point along the tube 140 where the pressure behind the carrier 130 decreases to a value less than the 0 psig in front of the carrier 130. This reversal of the ΔP across the carrier 130 creates a force in the direction of station 100, thereby further slowing the carrier 130 as the carrier 130 approaches station 101. When the predetermined time has elapsed, as noted by the timer 160, the controller 165 deactivates the solenoid valve 220, thereby opening port 210 and allowing free flow of air through conduit 125 and tube 140.

In order to send the carrier 130 from station 101 to station 100 an operator activates the second motor blower 110. This activation is accomplished by an operator actuating a switch 175, which is coupled to the controller 165. When switch 175 is actuated, the switch 175 sends a control signal to the controller 165. The controller 165 receives the control signal from switch 175 and provides a control signal to the second motor blower 110, to thereby activate the second motor blower 110. The motor blower 110 intakes air from the transport tube 140 and exhausts that air through vent/inlet 170 which lowers the pressure in the transport tube 140 and creates a ΔP across the carrier 130 moving it towards station 100.

As the carrier 130 moves through the tube 140, it reaches the portion of the tube 140 where it is detected by the sensor 151. The sensor 151 detects the presence of the carrier 130 as it passes a predetermined location in the transmission tube 140 and provides a control signal to the controller 165 indicative of that detection. The controller 165 receives this control signal from the sensor 151 and provides a control signal to the motor blower 110 to thereby deactivate motor blower 110, to solenoid valve 220 to thereby activate solenoid value 220, and to start the timer 160. Now the solenoid valve 220 is blocking port 210 thereby creating an air block in the conduit 125 and tube 140, as described above.

Once the air block is on, a finite amount of air remains in the tube 140 between the carrier 130 and the station 100 because no additional air can get through the air block created by valve disk 260 blocking port 210. As the carrier 130 continues to move through the tube 140 toward the station 100, the volume of the portion of the tube 140 between the air block and the carrier 130 decreases, and as that volume decreases, the air pressure in the tube 140 in front of the carrier 130 (station 100 side) increases because the amount of air between the air block and the carrier 130 remains substantially constant and it is being compressed into a smaller volume. The pressure on the station 101 side of the carrier 130, however, is substantially constant at 0 psig because the station 101 is open to the atmosphere. Therefore, the ΔP across the carrier 130 decreases as the carrier 130 moves toward the station 100 and the carrier 130 slows down due to the decreasing ΔP across the carrier 130.

The carrier 130 reaches a point along the tube 140 where the pressure in front of the carrier 130 increases to a value greater than the 0 psig behind of the carrier 130. This reversal of the ΔP across the carrier 130 creates a force in the direction of station 101, thereby further slowing the carrier 130 as the carrier 130 approaches station 100. When the predetermined time has elapsed, as noted by the timer 160, the controller 165 deactivates the solenoid valve 220.

Figure 4:
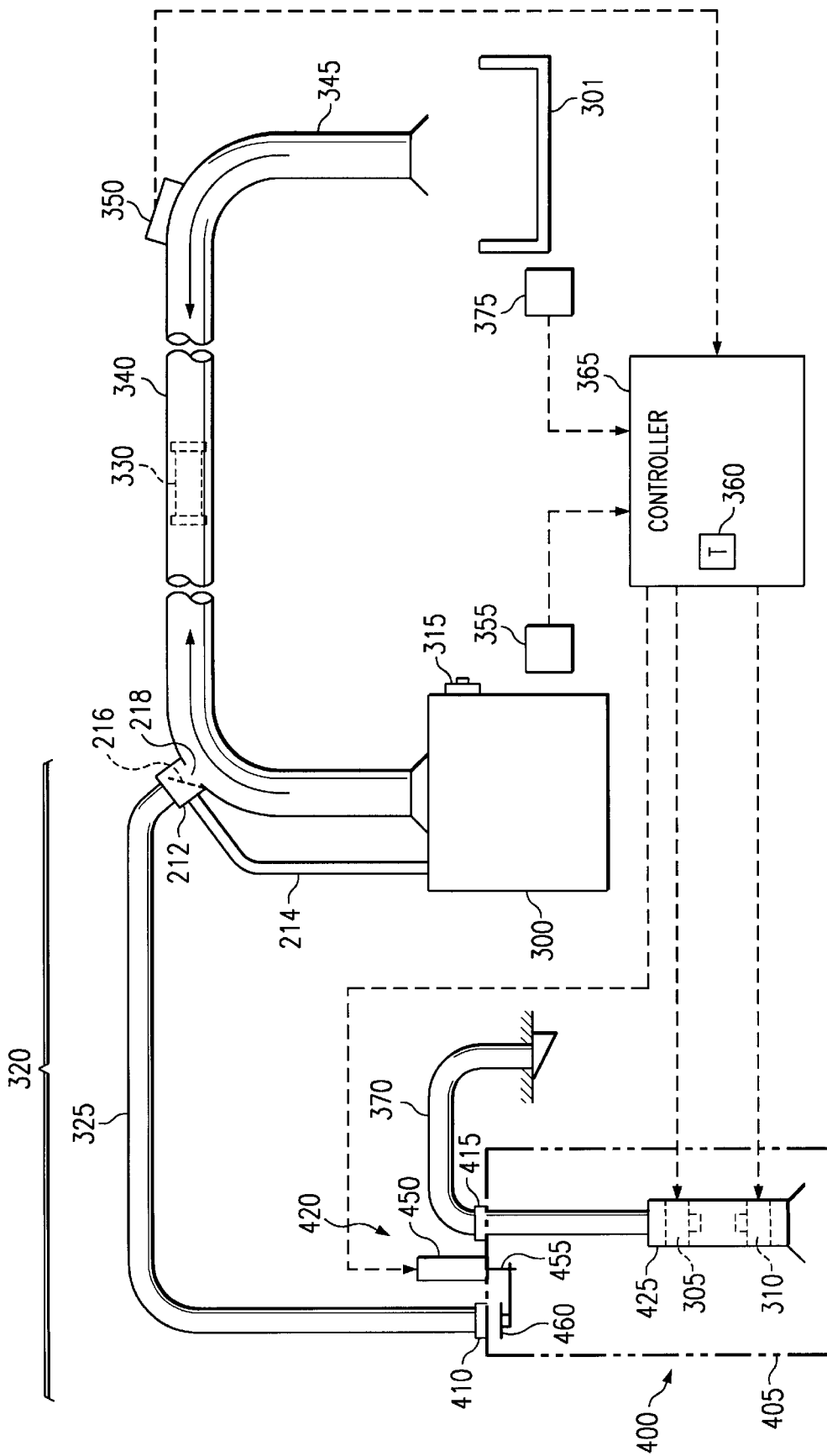
FIG. 4 is a schematic illustration of a pneumatic transmission system containing a preferred embodiment of a carrier automatic braking system in accordance with the present invention.

FIG. 4 illustrates a pneumatic transmission system containing a preferred embodiment of a carrier automatic braking system in accordance with the present invention.

The present system comprises a station 300 and a station 301 connected by a substantially airtight transport tube 340, which is open to the atmosphere at station 301, with a blower assembly 400 being positioned within a supply/exhaust branch 320 which is connected to station 300. The supply/exhaust branch 320 includes a conduit 325 which is substantially airtight and a vent/inlet 370 which is open to the atmosphere and can provide air from the atmosphere to the pneumatic transmission system or can allow the exhaust of air from the pneumatic transmission system to the atmosphere. Conduit 325 does not have to be of a similar internal diameter as tube 340 because no carrier is transported therethrough, only air. Conduit 325 is attached at one end to port 410 in blower housing 405 and at its other end to check/relief valve 212. A second conduit 214 connects check valve 212 to station 300. Check valve 212 also communicates with tube 340 directly, through port 245, and comprises leaf 216, which is adapted to cover port 218 in certain air flow situations. The blower assembly 400 is comprised of a substantially airtight blower housing 405, shown in phantom, which has a first port 410 and a second port 415 in one end. A solenoid valve 420 is mounted to the end of blower housing 405 such that, when actuated, solenoid shaft 455 at least partially retracts into solenoid housing 450, thereby blocking port 410 with valve disk 460, and preventing air flow through port 410. The present invention, however, is not limited to a solenoid valve. A pair of vacuum cleaner motor blowers 305 and 310 are positioned in a blower tube 425 in series with each other, meaning the vacuum cleaner motor blowers 305 and 310 are within the same air flow path. Furthermore, the vacuum cleaner motor blowers 305 and 310 are spatially separated from each other within the blower tube 425. Blower tube 425, and thus the vacuum cleaner motor blowers 305 and 310, are disposed within blower housing 405. Blower tube 425 is substantially open on one end and is substantially closed on the other end except for communication with port 415. The supply/exhaust branch 320 is connected to station 300 at one end and open to the atmosphere at vent/inlet 370 for supplying or exhausting air. Station 300 can be a closed station, meaning that it can be sealed by closing a door 315 so that, except for the supply/exhaust branch 320, it is substantially closed to the atmosphere during transport of a carrier 330. Station 301 can be either a closed station with a vent or a station which is open to the atmosphere during transport of the carrier 330, but it is shown as an open station for the purpose of this embodiment. The carrier 330 is capable of being filled with items to be transferred and is inserted at either station for transfer to the other station.

The transport tube 340, which is connected to station 300 at one end and to station 301 at its other end, is of sufficient internal diameter such that the carrier 330 can be transmitted therethrough. Transport tube 340 can have any spatial orientation and can include curved portions, straight portions, vertical portions, and horizontal portions, dependent upon the circumstances under which the system is going to be used. For example, the approach leg 345 is shown as a curve from a horizontal direction to a vertical downward direction. However, this approach leg 345 can also remain horizontal or curve in a vertical upward direction as it connects with station 301. The transport tube 340 and the carrier 330 can have nearly any desired dimension and cross section, dependent on the system needs. The transport tube 340 can include any transmission line of any crosssectional form having a pneumatic channel formed therethrough.

To send the carrier 330 from station 300 to station 301, the first motor blower 305 is activated during the transfer phase of the cycle to intake air through the vent/inlet 370 and to apply pressurized air to the carrier 330, which creates a ΔP across the carrier 330 and moves the carrier 330 upwardly, out of station 300, and then horizontally through the tube 340 toward station 301. The motor blower 305 can generate approximately 5 psig behind the carrier 330. Likewise, to send the carrier 330 from station 301 to station 300, the second motor blower 310 would be activated instead of the first motor blower 305, to exhaust air through the vent/inlet 370, thereby creating at least a partial vacuum in the tube 340 on the station 300 side of the carrier 330, while the station 301 side of the carrier 330 remains at 0 psig because it is open to the atmosphere. This ΔP across the carrier 330 generates a force moving the carrier 330 in the opposite or station 300 direction.

In order to send the carrier 330 from station 300 to station 301, the carrier 330 is placed in the tube 340 and the door 315 is shut and sealed. The first motor blower 305 is then activated. This can be done by an operator actuating a switch 355, which is coupled to a controller 365. The controller 365 is coupled to the first motor blower 305 and to the second motor blower 310 for selective activation of the blowers 305 and 310. When switch 355 is actuated, the switch 355 sends a control signal to the controller 365. The controller 365 receives the control signal from the switch 355 and provides a control signal to the first motor blower 305, to thereby activate the first motor blower 305. The controller 365 is also coupled to a sensor 350 which is positioned near or on the transmission tube 340. The sensor 350 does not need to be in physical contact with the transmission tube 340, but it must be positioned such that it is able to sense the carrier 330 as the carrier 300 passes a predetermined location in the transmission tube 340 related to the approach of the carrier 330 to the station 301. The present invention is not limited to an electrical coupling, or even a physical connection, between the controller 365 and its peripherals.

First motor blower 305 blows air through conduit 325 and into check/relief valve 212. The air flow into check/relief valve 212 exerts pressure onto leaf 216, thereby causing leaf 216 to cover port 218. With port 218 blocked, air flows out of check/relief valve 212, through a second conduit 214, to the first station 300, and creates a ΔP across the carrier 330, thus moving it towards station 301. The rotor blowers used in this embodiment can be standard vacuum cleaner motor blowers such as Model No. 115923 manufactured by Ametek Lamp. Vacuum cleaner motor blowers 305 and 310 are substantially equal in size and in output capacity, although mounted in opposite directions. These vacuum cleaner motor blowers 305 and 310 are capable of operating at approximately 23000 RPM and of generating approximately 124 CFM.

As the carrier 330 moves through the tube 340, it reaches the portion of the tube 340 where it is detected by the sensor 350. The sensor 350 detects the presence of the carrier 330 as it passes a predetermined location in the transmission tube 340 and provides a control signal to the controller 365 indicative of that detection. The controller 365 receives this control signal from the sensor 350 and provides a control signal to first motor blower 305 to thereby deactivate the first motor blower 305, to solenoid valve 420 to thereby actuate solenoid valve 420 thus blocking port 410, and to start the timer 360. The timer 360 can be an external peripheral device or it can be integrated in the controller 365. In this embodiment, timer 360 is preferably a Model No. RTE B21 manufactured by IDEC. An air block is created in conduit 325, and thus in tube 340, by the blocking of port 410 by solenoid valve 420.

Once the air block is on, a finite amount of air remains in the tube 340 between the carrier 330 and the station 300 because no additional air can get by solenoid valve 420 and through port 410 in either direction. As the carrier 330 continues to move through the tube 340 toward the station 301, the volume of the portion of the tube 340 between the air block and the carrier 330 increases, and as that volume increases, the air pressure in the tube 340 behind the carrier 330 decreases because the amount of air between the air block and the carrier 330 remains substantially constant. The pressure on the station 301 side of the carrier 330, however, is substantially constant at 0 psig because the station 301 is open to the atmosphere. Therefore, as the pressure between the air block and the carrier 330 decreases as the carrier 330 moves through the final approach section 345 of the tube 340, the carrier 330 slows down due to the decreasing ΔP across the carrier 330. In this embodiment, the carrier 330 reaches a point along the tube 340 where the pressure behind the carrier 330 decreases to a value less than the 0 psig in front of the carrier 330. This reversal of the ΔP across the carrier 330 creates a force in the direction of station 300, thereby further slowing the carrier 330 as the carrier 330 approaches station 301. When the predetermined time has elapsed, as noted by the timer 360, the controller 365 deactivates the solenoid valve 420; thereby opening port 410 and allowing free flow of air through conduit 325, second conduit 214, and tube 340. Upon opening of solenoid valve 420, leaf 216 in check valve 212 is free to open, thereby allowing free flow of air through port 218.

In order to send the carrier 330 from station 301 to station 300 an operator activates the second motor blower 310. This activation is accomplished by an operator actuating a switch 375, which is coupled to the controller 365. When switch 375 is actuated, the switch 375 sends a control signal to the controller 365. The controller 365 receives the control signal from switch 375 and provides a control signal to the second motor blower 310, to thereby activate the second motor blower 310. The motor blower 310 intakes air from the transport tube 340 and exhausts that air through vent/inlet 370 which lowers the pressure in the transport tube 340 and creates a ΔP across the carrier 330 moving it towards station 300. Air propelled by motor blower 310 entering check/relief valve 212 from tube 340 holds leaf 216 in check/relief valve 212 open, thereby allowing free flow of air through port 218. Virtually no air flow occurs through tube 340 between port 218 and station 300, through station 300, or through second conduit 214, since the air flow will find the path of least resistance, which is through port 218.

As the carrier 330 moves through the tube 340, it reaches the portion of the tube 340 where port 218 is located. After carrier 330 passes port 218, the pressure in the tube 340 on the station 300 side of carrier 330 increases, thereby decreasing, and preferably virtually eliminating, the ΔP across carrier 330. The carrier 330 free falls into station 300.

While preferred embodiments of the present invention has been described, with respect to certain preferred embodiments, it should be apparent to those skilled in the art that it is not so limited. Various other modifications may be made without departing from the spirit and scope of the invention. It is intended that the following claims be interpreted to embrace all such variations and modifications.

What is claimed is:

1. A pneumatic transmission system comprising:
   a first station for sending or receiving a carrier;
   a second station for sending or receiving said carrier;
   a transport conduit connected between said first station and said second station, wherein said transport conduit is capable of permitting a transfer of said carrier between said first station and said second station;

a supply/exhaust branch connected to said first station such that air can flow between said supply/exhaust branch and said first station, said supply/exhaust branch having an opening which can serve as an air inlet for providing the air from atmosphere through said supply/exhaust branch to the pneumatic transmission system and as an air vent for exhausting the air from the pneumatic transmission system through the supply/exhaust branch to the atmosphere;

a first motor blower positioned within said supply/exhaust branch, wherein said first motor blower is capable of moving a volume of the air through said supply/exhaust branch and said transport conduit in a first direction;

a valve positioned within said supply/exhaust branch, wherein said valve is capable of stopping the flow of the air through said supply/exhaust branch and said transport conduit;

a sensor associated with said transport conduit so that said sensor is capable of detecting a presence of said carrier at a predetermined location in said transport conduit associated with an approach of said carrier to one of said first station and said second station and of generating a control signal in response to a detection of said carrier by said sensor;

a controller coupled to said sensor and to said first motor blower, wherein said controller activates said first motor blower to move said carrier between said first station and said second station and then deactivates said first blower motor and closes said valve in response to said control signal from said sensor, indicating the detection of said carrier at said predetermined location to thereby form an air block within said supply/exhaust branch to decrease a differential pressure across said carrier and cause said carrier to slow down as said carrier approaches said one of said first station and said second station; and a timer capable of providing a timing control signal when a predetermined amount of time has elapsed, and wherein said controller activates said timer in response to the detection of said carrier at said predetermined location in said transport conduit associated with the approach of said carrier to said one of said first station and said second station and said controller opens said valve in response to said timing control signal.

2. A pneumatic transmission system in accordance with claim 1 wherein said valve is a solenoid valve, said solenoid valve comprising a valve disk, wherein said valve disk is capable of stopping the flow of air through said supply/exhaust branch and said transport conduit.

3. A pneumatic transmission system in accordance with claim 1 wherein said transport conduit is a pneumatic tube which is substantially sealed from the atmosphere.

4. A pneumatic transmission system in accordance with claim 1 wherein said transport conduit terminates at said second station in a vertically downward direction.

5. A pneumatic transmission system in accordance with claim 1 wherein said closing of said valve forms an air block within said supply/exhaust branch to reverse the differential pressure across said carrier as said carrier approaches said one of said first station and said second station.

6. A pneumatic transmission system comprising:
a first station for sending or receiving a carrier;
a second station for sending or receiving said carrier;
a transport conduit connected between said first station and said second station, wherein said transport conduit is capable of permitting a transfer of said carrier between said first station and said second station;

a supply/exhaust branch connected to said first station such that air can flow between said supply/exhaust branch and said first station, said supply/exhaust branch having an opening which can serve as an air inlet for providing the air from atmosphere through said supply/exhaust branch to the pneumatic transmission system and as an air vent for exhausting the air from the pneumatic transmission system through the supply/exhaust branch to the atmosphere;

a first motor blower positioned within said supply/exhaust branch, wherein said first motor blower is capable of moving a volume of the air through said supply/exhaust branch and said transport conduit in a first direction;

a solenoid valve positioned within said supply/exhaust branch, said solenoid valve comprising a valve disk, wherein said valve disk is capable of stopping the flow of the air through said supply/exhaust branch and said transport conduit;

a sensor associated with said transport conduit so that said sensor is capable of detecting a presence of said carrier at a predetermined location in said transport conduit associated with an approach of said carrier to one of said first station and said second station and of generating a control signal in response to a detection of said carrier by said sensor;

a controller coupled to said sensor and to said first motor blower, wherein said controller activates said first motor blower to move said carrier between said first station and said second station and then deactivates said first blower motor and closes said valve in response to said control signal from said sensor, indicating the detection of said carrier at said predetermined location to thereby form an air block within said supply/exhaust branch to decrease a differential pressure across said carrier and cause said carrier to slow down as said carrier approaches said one of said first station and said second station; and a timer capable of providing a timing control signal when a predetermined amount of time has elapsed, and wherein said controller activates said timer in response to the detection of said carrier at said predetermined location in said transport conduit associated with the approach of said carrier to said one of said first station and said second station and said controller opens said valve in response to said timing control signal, wherein said first station apart from said supply/exhaust branch can be substantially closed to the atmosphere, and wherein said second station is open to the atmosphere.

7. A pneumatic transmission system in accordance with claim 6, further comprising:
a second motor blower positioned in series with said first motor blower within said supply/exhaust branch, adjacent to and opposite said first motor blower,
wherein said second motor blower is capable of moving a volume of the air through said supply/exhaust branch and said transport conduit in a second direction which is opposite to said first direction.

8. A pneumatic transmission system in accordance with claim 7 wherein said second motor blower is positioned spatially separated from said first motor blower, and wherein said first motor blower and said second motor blower move the air through an identical air path within said supply/exhaust branch.

9. A pneumatic transmission system in accordance with claim 8 further comprising a start button coupled to said controller, wherein said start button can be manually actuated to provide a start control signal to said controller for activating said first motor blower to send said carrier from said first station to said second station.

10. A pneumatic transmission system in accordance with claim 9 further comprising a second start button coupled to said controller, wherein said second start button can be manually actuated to provide a second start control signal to said controller for activating said second motor blower to send said carrier from said second station to said first station.

11. A pneumatic transmission system in accordance with claim 10, further comprising a check/relief valve positioned within said supply/exhaust branch and connected with said transport conduit, wherein said check/relief valve is capable of stopping the flow of air through a connection between said check/relief valve and said transport conduit.

12. A method for slowing a carrier in a pneumatic transmission system comprising the steps of:

(a) activating a first motor blower to move air through a supply/exhaust branch and a transport conduit in a first direction, to thereby create a differential pressure across said carrier and transmit said carrier from a first station toward a second station via said transport conduit, wherein said second station is open to atmosphere;

(b) sensing a presence of said carrier at a predetermined location along said transport conduit, wherein said predetermined location is associated with a transmission of said carrier from said first station to said second station; and (c) closing a valve for a predetermined time period to block air flow within said supply/exhaust branch and within a portion of said transport conduit between said first station and said carrier, thereby creating an air block within said supply/exhaust branch so as to reduce a value of the differential pressure across said carrier as said carrier makes a final approach to said second station.

13. The method for slowing said carrier in said pneumatic transmission system in accordance with claim 12 wherein said step of closing said valve creates the air block so as to reverse the value of the differential pressure across said carrier as said carrier makes the final approach to said second station.

14. The method for slowing said carrier in said pneumatic transmission system in accordance with claim 12, further comprising the step of activating a timer after said sensing step, whereby said timer is set to said predetermined time period and generates a control signal when said predetermined time period has elapsed.

15. The method for slowing said carrier in said pneumatic transmission system in accordance with claim 12, further comprising the step of:

(d) opening said valve to thereby allow free flow of air within said supply/exhaust branch.

16. A pneumatic transmission system comprising:

a first station for sending or receiving a carrier;

a second station for sending or receiving said carrier;

a transport conduit connected between said first station and said second station, wherein said transport conduit is capable of permitting a transfer of said carrier between said first station and said second station;

a supply/exhaust branch connected to said first station such that air can flow between said supply/exhaust branch and said first station, said supply/exhaust branch having an opening which can serve as an air inlet for providing the air from atmosphere through said supply/exhaust branch to the pneumatic transmission system and as an air vent for exhausting the air from the pneumatic transmission system through the supply/exhaust branch to the atmosphere;

a first motor blower positioned within said supply/exhaust branch, wherein said first motor blower is capable of moving a volume of the air through said supply/exhaust branch and said transport conduit in a first direction;

a valve positioned within said supply/exhaust branch, wherein said valve is capable of stopping the flow of the air through said supply/exhaust branch and said transport conduit;

a sensor associated with said transport conduit so that said sensor is capable of detecting a presence of said carrier at a predetermined location in said transport conduit associated with an approach of said carrier to one of said first station and said second station and of generating a control signal in response to a detection of said carrier by said sensor;

a controller coupled to said sensor and to said first motor blower, wherein said controller activates said first motor blower to move said carrier between said first station and said second station and then deactivates said first blower motor and closes said valve in response to said control signal from said sensor, indicating the detection of said carrier at said predetermined location to thereby form an air block within said supply/exhaust branch to decrease a differential pressure across said carrier and cause said carrier to slow down as said carrier approaches said one of said first station and said second station; and a check/relief valve positioned within said supply/exhaust branch and connected with said transport conduit, wherein said check/relief valve is capable of stopping the flow of air through a connection between said check/relief valve and said transport conduit.

17. A pneumatic transmission system in accordance with claim 16 further comprising a timer capable of providing a timing control signal when a predetermined amount of time has elapsed, wherein said controller activates said timer in response to the detection of said carrier at said predetermined location in said transport conduit associated with the approach of said carrier to said one of said first station and said second station, and wherein said controller opens said valve in response to said timing control signal.

18. A pneumatic transmission system in accordance with claim 17, further comprising a second motor blower positioned in series with said first motor blower within said supply/exhaust branch, adjacent to and opposite said first motor blower, wherein said second motor blower is capable of moving a volume of the air through said supply/exhaust branch and said transport conduit in a second direction which is opposite to said first direction.

19. A pneumatic transmission system in accordance with claim 18 wherein said second motor blower is positioned spatially separated from said first motor blower, and wherein said first and second motor blowers move the air through an identical air path within said supply/exhaust branch.

20. A pneumatic transmission system in accordance with claim 19 further comprising a start button coupled to said controller, wherein said start button can be manually actuated to provide a start control signal to said controller for activating said first motor blower to send said carrier from said first station to said second station.

21. A pneumatic transmission system in accordance with claim 20 further comprising a second start button coupled to said controller, wherein said second start button can be manually actuated to provide a second start control signal to said controller for activating said second motor blower to send said carrier from said second station to said first station.

* * * * *